(12) United States Patent
Yeomans

(10) Patent No.: US 11,402,059 B2
(45) Date of Patent: Aug. 2, 2022

(54) BASE HAVING CONCENTRIC ANCHOR

(71) Applicant: Gary Yeomans, Orlando, FL (US)

(72) Inventor: Gary Yeomans, Orlando, FL (US)

(*) Notice: Subject to any disclaimer, the term of this patent is extended or adjusted under 35 U.S.C. 154(b) by 0 days.

(21) Appl. No.: 16/592,095

(22) Filed: Oct. 3, 2019

(65) Prior Publication Data

US 2020/0173603 A1    Jun. 4, 2020

Related U.S. Application Data

(60) Provisional application No. 62/740,668, filed on Oct. 3, 2018.

(51) Int. Cl.
*F16M 11/38* (2006.01)
*G09F 13/16* (2006.01)
*F16M 11/34* (2006.01)

(52) U.S. Cl.
CPC ............. *F16M 11/38* (2013.01); *F16M 11/34* (2013.01); *G09F 13/16* (2013.01); *F16M 2200/02* (2013.01)

(58) Field of Classification Search
CPC ..... F16M 11/38; F16M 2200/02; G09F 13/16
USPC ....... 248/688, 460, 463, 464, 472, 530, 156; 248/370, 163.1, 165, 166, 168, 169, 170; 40/607.01, 607.03, 607.04, 607.05, 40/607.06, 607.1
See application file for complete search history.

(56) References Cited

U.S. PATENT DOCUMENTS

| | | | | |
|---|---|---|---|---|
| 4,483,506 A * | 11/1984 | Litwiller | ................ | E01F 9/685 248/156 |
| 4,700,655 A * | 10/1987 | Kirby | ...................... | B60R 13/00 116/174 |
| 4,790,092 A * | 12/1988 | Farmer | ..................... | G09F 7/18 40/606.19 |
| 4,832,304 A * | 5/1989 | Morgulis | ............... | A01K 97/10 135/16 |
| 4,910,902 A * | 3/1990 | Anderson | ................. | G09F 7/18 248/156 |
| 5,104,074 A * | 4/1992 | Malloy | ............... | E04H 12/2215 156/63 |
| 5,156,369 A * | 10/1992 | Tizzoni | ............... | E04H 12/2223 135/16 |
| 5,502,910 A * | 4/1996 | Lucchesi | ................... | G09F 7/22 173/91 |
| 5,921,035 A * | 7/1999 | Kempf | ................ | E04H 12/2223 248/545 |
| 6,254,043 B1 * | 7/2001 | Schwarzler | ............ | F16M 11/16 248/163.1 |
| 6,463,687 B1 * | 10/2002 | Dorstewitz | ............... | G09F 7/18 248/171 |
| 7,062,872 B2 * | 6/2006 | Williams | ................... | G09F 7/00 160/377 |
| 9,208,706 B1 * | 12/2015 | Baron | ................. | G09F 15/0056 |
| 9,447,599 B1 * | 9/2016 | Parent | ..................... | E04H 17/22 |
| 2004/0004168 A1 * | 1/2004 | Crain | ..................... | F16M 13/02 248/188.8 |
| 2007/0131824 A1 * | 6/2007 | Harold | ................ | E04H 12/2223 248/156 |

(Continued)

*Primary Examiner* — Eret C McNichols
*Assistant Examiner* — Michael McDuffie
(74) *Attorney, Agent, or Firm* — Lowndes; Jon M. Gibbs

(57) ABSTRACT

A base for supporting an object comprising a plurality of legs, a shaft concentrically located relative to the legs, an anchor attached to the shaft, and an attachment point for receiving an object. The anchor can be inserted into a substrate to maintain the stability of the base.

20 Claims, 12 Drawing Sheets

(56) References Cited

U.S. PATENT DOCUMENTS

| | | | |
|---|---|---|---|
| 2009/0026331 A1* | 1/2009 | Law | F16M 11/40 |
| | | | 248/163.1 |
| 2012/0204455 A1* | 8/2012 | Mothaffar | G09F 15/0062 |
| | | | 40/610 |
| 2015/0108295 A1* | 4/2015 | Brooks | F16M 11/242 |
| | | | 248/156 |
| 2015/0285428 A1* | 10/2015 | Duperron | F16M 11/245 |
| | | | 248/163.1 |
| 2016/0166049 A1* | 6/2016 | Hwang | F16M 11/242 |
| | | | 248/156 |

* cited by examiner

BASE HAVING CONCENTRIC ANCHOR

CLAIM OF PRIORITY

This application claims the benefit of U.S. Provisional Patent Application Ser. No. 62/740,668, filed Oct. 3, 2018.

FIELD OF INVENTION

The present disclosure generally relates to safety signs and more specifically to modular foldable safety signs.

BACKGROUND

Temporary signage has an important place in maintaining safety. Drawbacks to current temporary signage include signs that are too light and have no meaningful stability in adverse conditions which tend to blow over or blow away in a wind. The current solution to temporary signage to avoid loss of the sign is to provide a sign that has a base that is so heavy that the sign itself is cumbersome to move or the sign is incorporated onto a trailer requiring a tow vehicle for transport.

SUMMARY

In accordance with the teachings disclosed herein, embodiments related to modular safety signs are disclosed.

In an embodiment, a base for supporting an object includes a plurality of legs, a shaft concentrically located relative to the legs, an anchor attached to the shaft, and an attachment point for receiving an object. The anchor may be inserted into a substrate to maintain the stability of the base. The legs of the base can be foldable and can further be locked into place by a locking member. The legs can include printed indicia and/or reflective material to increase the overall visibility of the base. A means to rotate the shaft can connect to the attachment point to facilitate the insertion of the anchor into the substrate. The anchor can be removable from the shaft and can be an auger, screw, bolt, helix, spike or any other similar anchor-like object sufficient to secure the base to a substrate. A sign body can be attached to the attachment point. The sign body can be foldable and can contain printed indicia and/or reflective material.

The sign can be used in connection with any situation that warrants the need for alerting others to a potentially hazardous or caution condition. By way of example, the apparatus can be used for notifying oncoming drivers of: roadside vehicle repair; the presence of children; persons laying on the beach flooding conditions; construction areas; vehicle accidents; downed power lines; pot holes; road closings; downed trees; hazardous covered areas, such as snow covered ditches; the presence of animals; and any other situation warranting a warning or caution sign.

By way of further example, the apparatus may be used for generally notifying passersby of situations such as: crime scene or other police activity; sink holes; uneven or closed sidewalks; generally slippery or dangerous conditions; beach or sandbar anchor hazards; or any other situation warranting a warning or caution sign.

Use of the sign disclosed herein is not limited to caution or warning conditions, but may include general information, such as, for example, use during community or private events. Moreover, the sign is not limited to analog or printed information, but can contain programmable digital information.

DETAILED DESCRIPTION OF THE PREFERRED EMBODIMENTS

A detailed description of the embodiments for a system, device, and method for providing a base having a concentric anchor will now be presented with reference to the drawings. One of skill in the art will recognize that these embodiments are not intended to be limitations on the scope, and that modifications are possible without departing from the spirit thereof. In certain instances, well-known methods, procedures, and components have not been described in detail.

Figure 1:
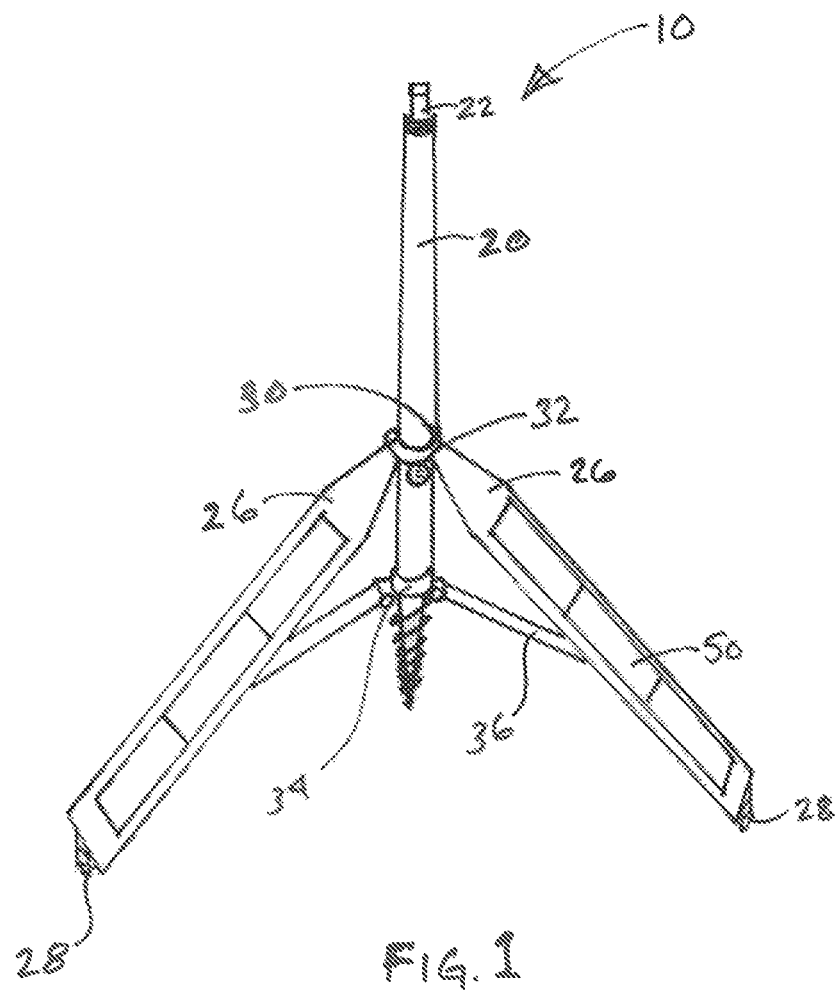
FIG. 1 is an illustration of a base having a concentric anchor in accordance with aspects of the present invention.
Figure 2:
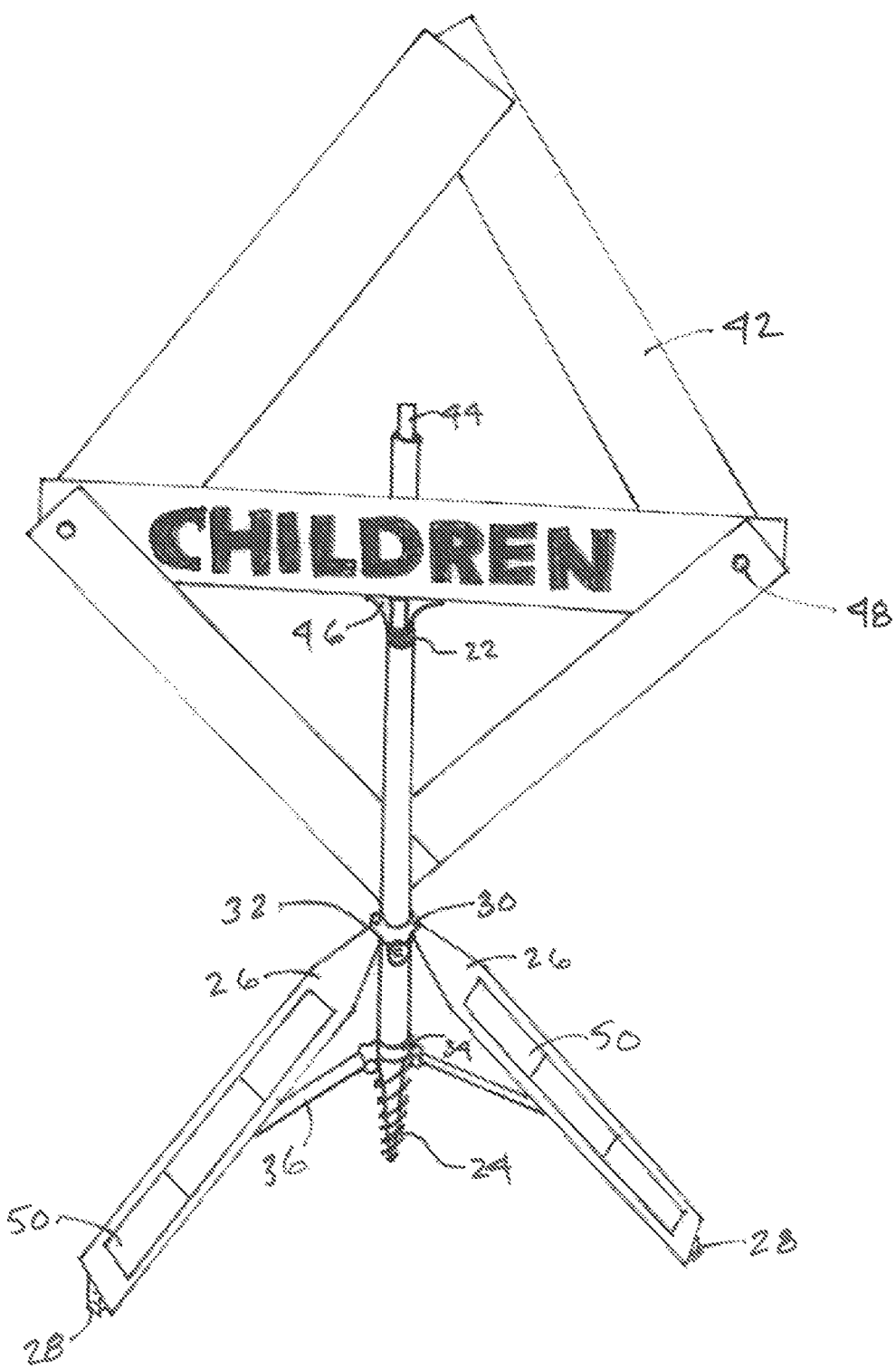
FIG. 2 is an illustration of a base having a concentric anchor with attached signage in accordance with aspects of the present invention.
Figure 3:
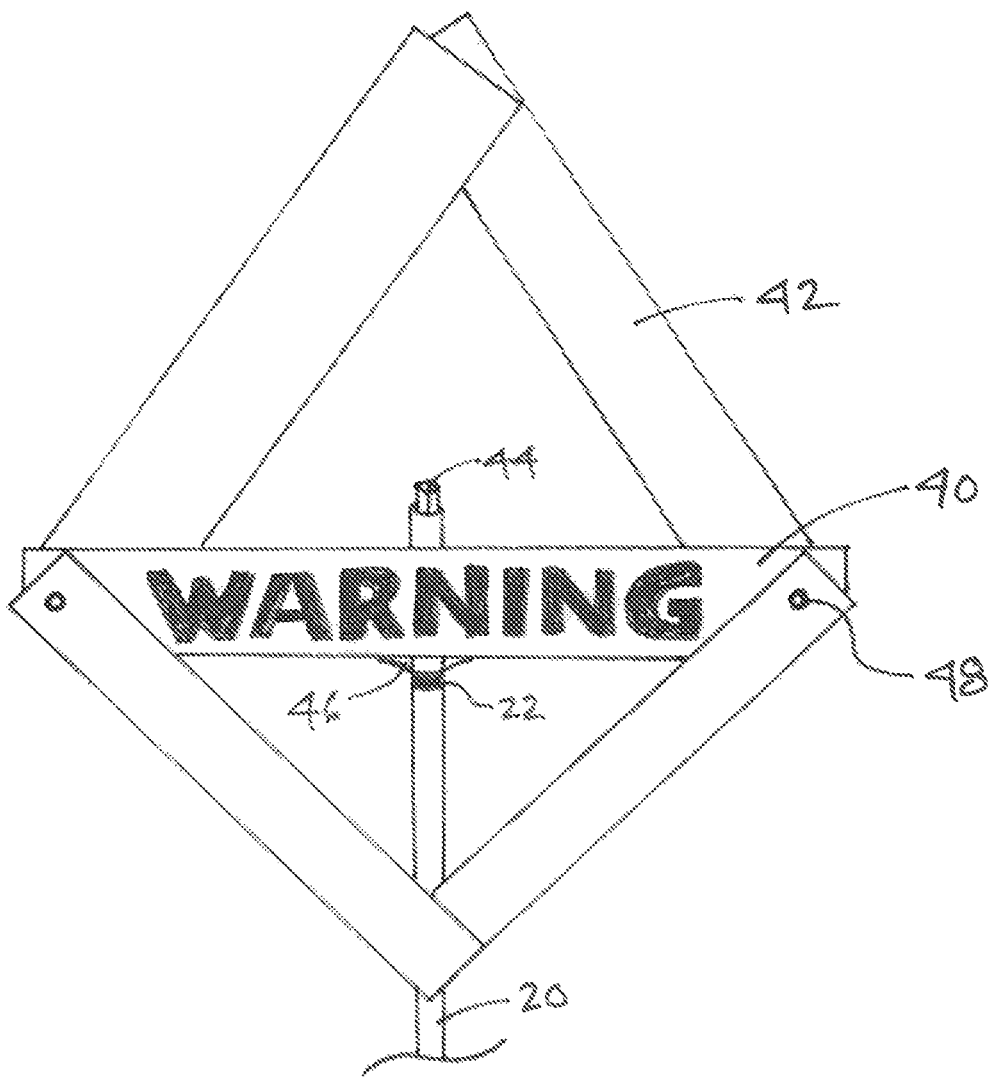
FIG. 3 is an illustration of an alternate signage embodiment in accordance with aspects of the present invention.
Figure 4:
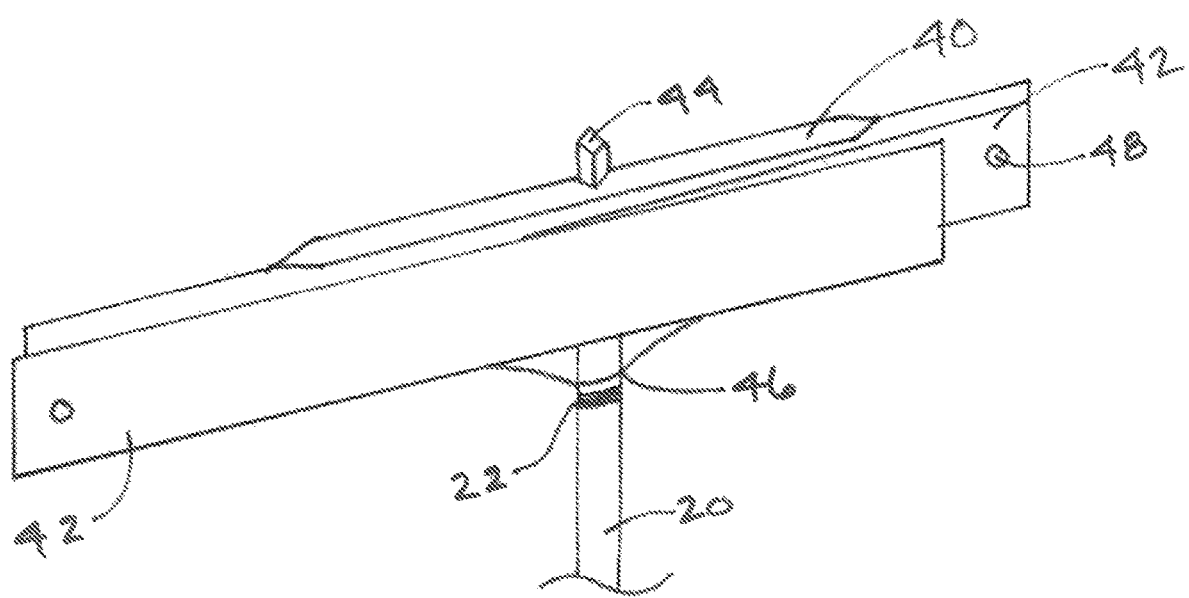
FIG. 4 is an illustration of a folded signage embodiment in accordance with aspects of the present invention.
Figure 5:
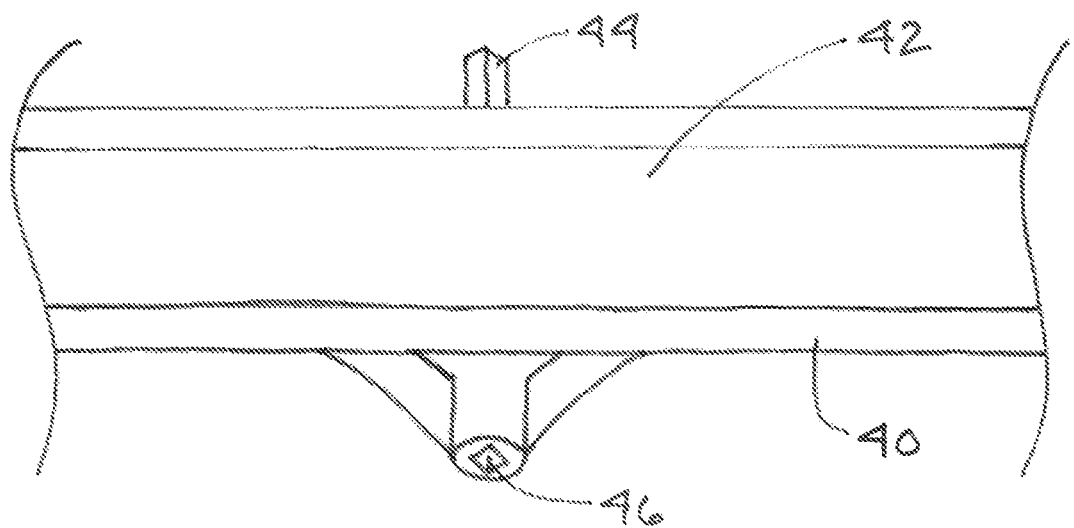
FIG. 5 is a partial illustration of a folded signage embodiment showing a mounting receiver in accordance with aspects of the present invention.
Figure 6:
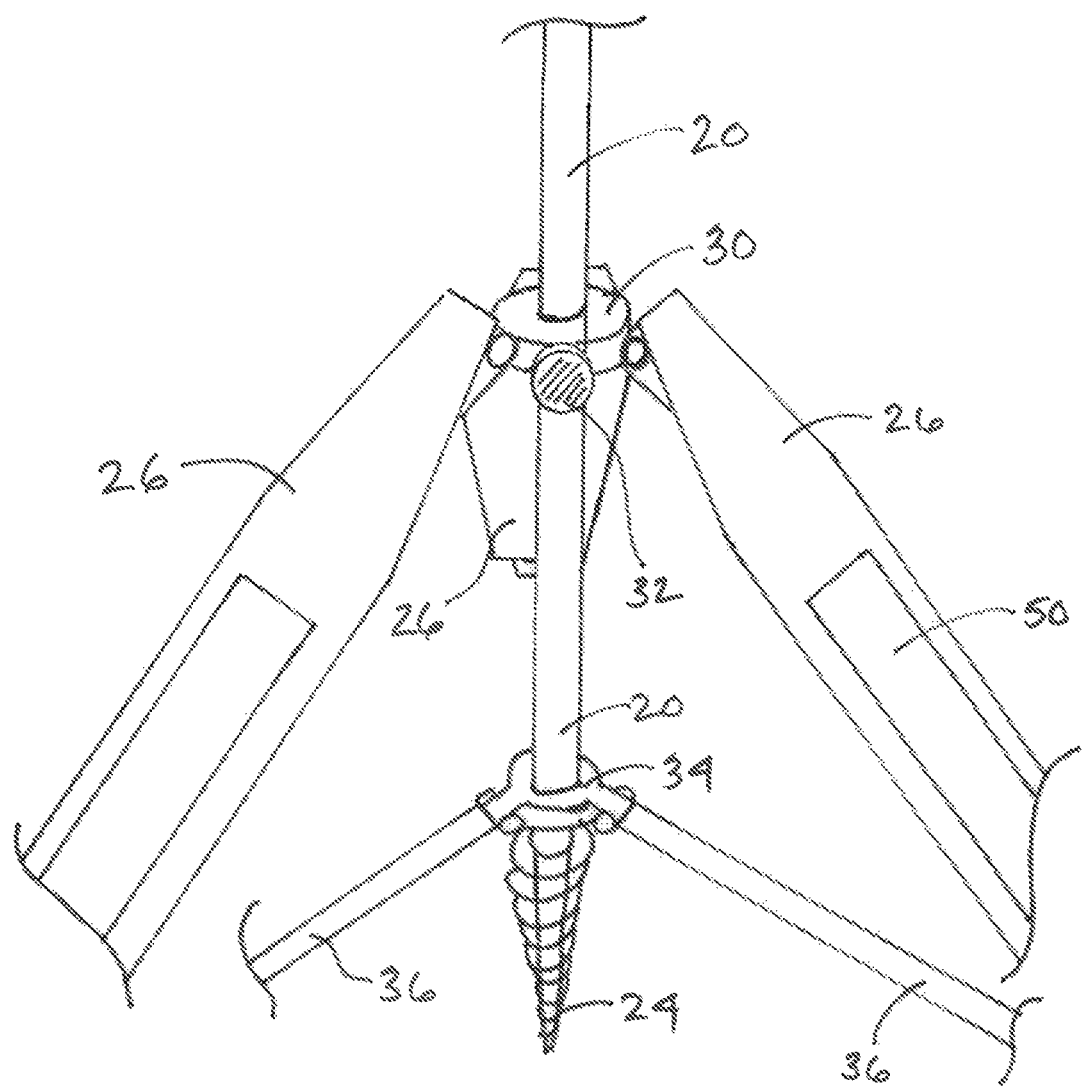
FIG. 6 is a partial illustration of the base showing the concentric anchor in accordance with aspects of the present invention.
Figure 7:
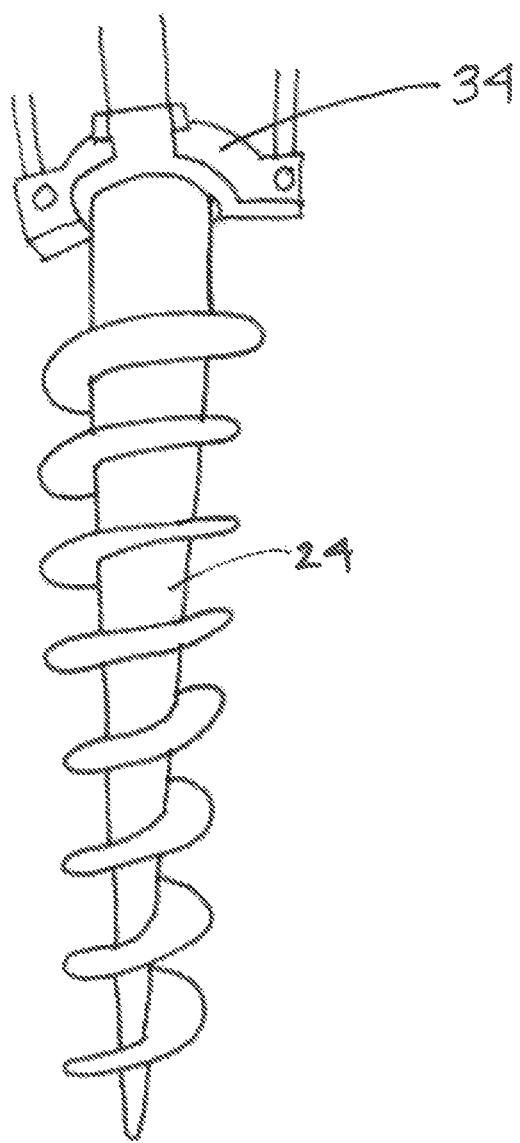
FIG. 7 is an illustration of an anchor in accordance with aspects of the present invention.

Referring first to FIGS. 1 and 2, the base 10 having a concentric anchor 24 generally comprises a shaft 20 having a mounting member 22 at a first end of the shaft 20 and an anchor 24 at a second end of the shaft 20. The base 10 further comprises a plurality of legs 26. Each leg 26 can be attached at a first end of the leg 26 to an adjustable attachment 30, connected to a support member 36 near the middle of the leg 26, and comprise a cleat 28 at the second end of the legs 26. The shaft 20 is received in the adjustable attachment 30 which can further comprise a locking member 32. The support member 36 can be attached to a leg 26 at a first end and attached to a static attachment member 34 at a second end of the support member 36. The static attachment member 34 also receives the shaft 20 and operates to allow the shaft 20 to be rotated therein while maintaining the concentric position of shaft 20 relative to the support members 36 and legs 26. Similarly, the adjustable attachment 30, also attached to the legs 26 receives the shaft 20 therein and operates to allow the shaft 20 to be rotated therein while maintaining the concentric position of the shaft 20.

The legs 26 can be attached to the adjustable attachment member 30 in a hinge-like manner with the use of pins, screws, bolts, rivets, or any other flexible means to facilitate the folding of the legs 26 against the shaft 20 while retaining the general rigidity of the structure necessary for use. The legs 26 can be attached to the support members 36 in a hinge-like manner with the use of pins, screws, bolts, rivets, or any other flexible means to facilitate the folding of the legs 26 against the shaft 20 while retaining the general rigidity of the structure necessary for use. The support members 36 can be attached to the static attachment member 34, in a hinge-like manner with the use of pins, screws, bolts, rivets, or any other flexible means to facilitate the folding of the legs 26 against the shaft 20 while retaining the general rigidity of the structure necessary for use.

Figure 8:
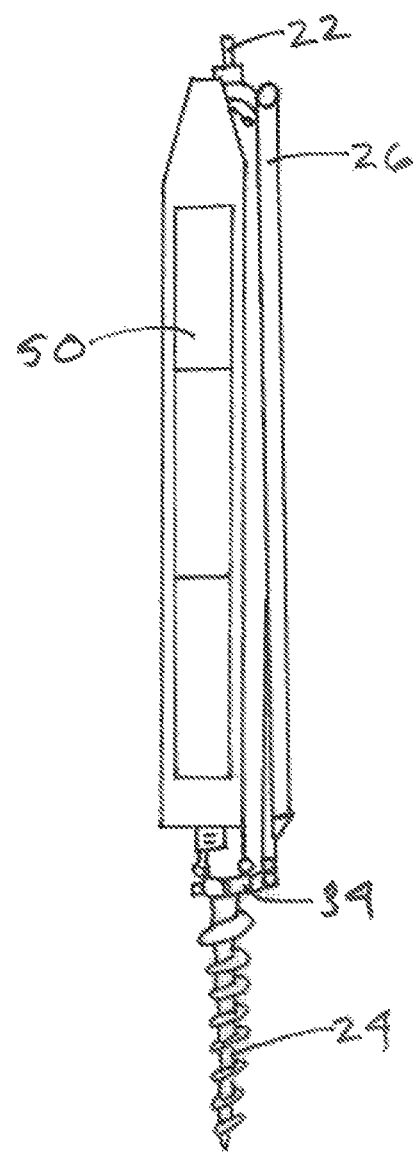
FIG. 8 is an illustration of a folded base having a concentric anchor in accordance with aspects of the present invention.
Figure 9:
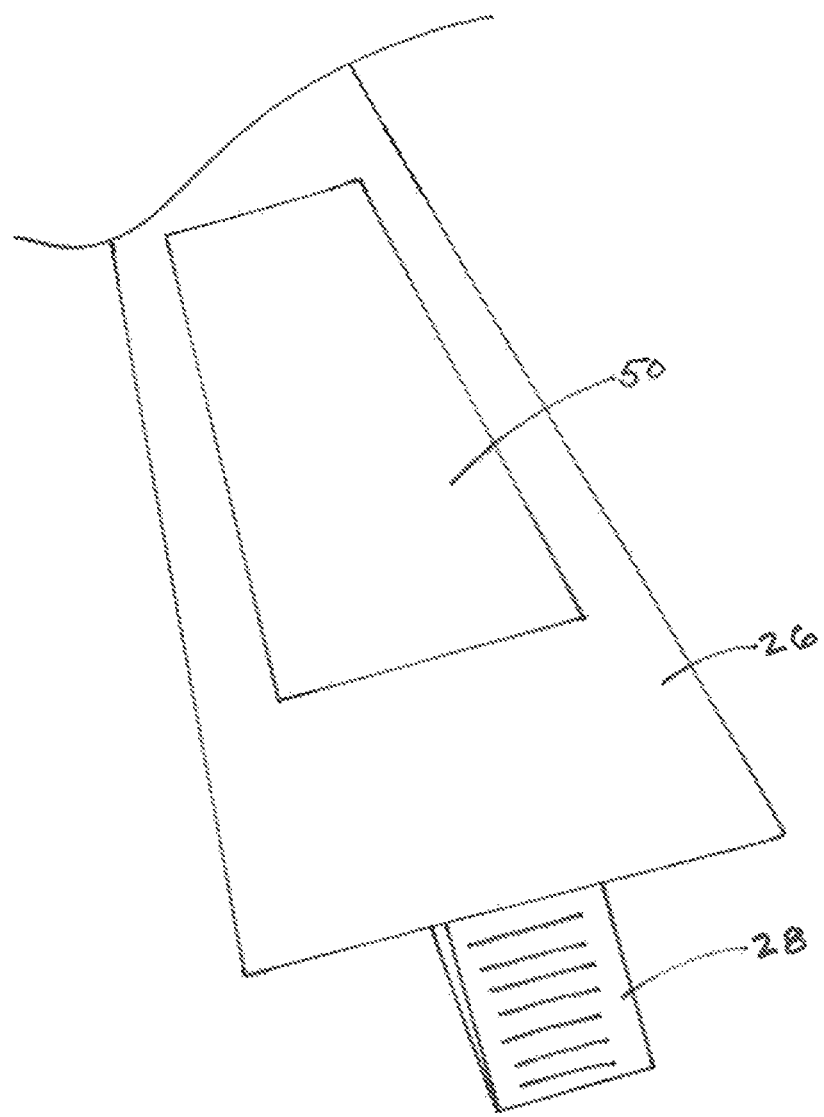
FIG. 9 is an illustration of an embodiment of leg of a base showing a cleat in accordance with aspects of the present invention.
Figure 10:
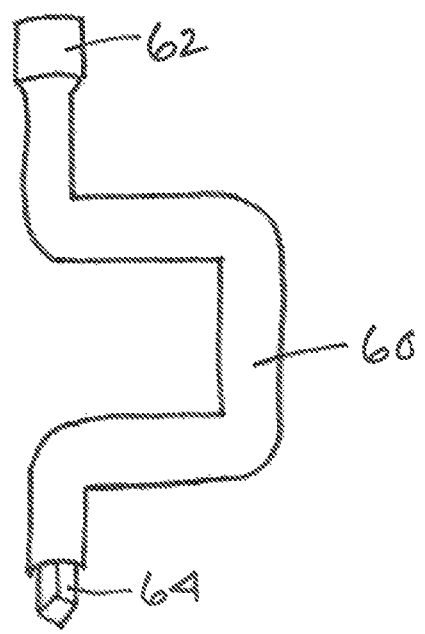
FIG. 10 is an illustration of a driving brace for driving an anchor in accordance with aspects of the present invention.
Figure 11A:
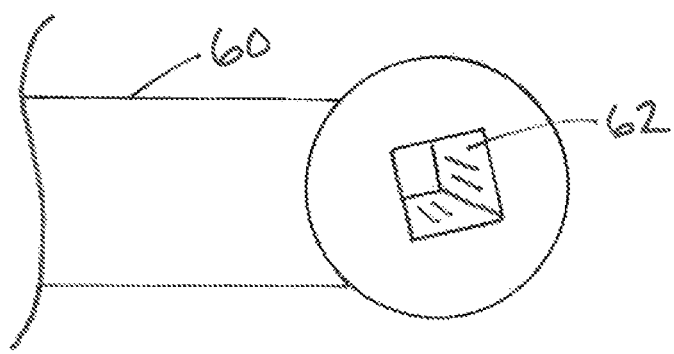
FIG. 11a is an illustration of a driving receiver located on the driving brace in accordance with aspects of the present invention.
Figure 11B:
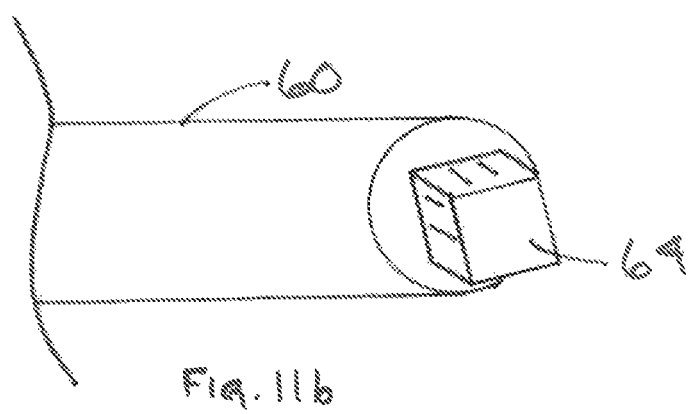
FIG. 11b is an illustration of a driver attachment point located on the driving brace in accordance with aspects of the present invention.

Movement of the adjustable attachment 30 down the shaft 20 can operate to extend the second end of the legs 26 away from the shaft and provide a more stable position on a substrate (not shown). The adjustable attachment 30 can be positioned to allow the legs 26 to be folded, fully extended or any position there between. The legs 26 may be locked in the position by engaging the locking member 32. The locking member 32 can comprise a friction screw, a pin, a cam, a friction cuff, or any other means known in the art to maintain the position of adjustable the attachment 30 on the shaft 20. As shown in FIG. 8, moving the adjustable attachment 30 up the shaft 20 can operate to bring the legs 26 closer to the shaft 20 and reduce the profile of the apparatus 10. This folded position is not necessarily limiting as the base 10 may still be anchored to a substrate through use of only the anchor 24. The configuration of the legs 26 of the base 10 as shown herein is generally the tripod configuration, but such configuration is not intended to be limiting as the base 10 can include additional legs 26 as necessary or desired, so long as the anchor is substantially concentric to the legs 26 as shown herein.

The anchor 24 can be affixed to the shaft 20 to allow the anchor 24 to rotate as the shaft 20 is rotated. The anchor 24 can comprise any type of mechanism that may be driven into a substrate, such as, for example, an auger, screw, bolt, helix, or spike. The anchor 24 may be removably attached to the shaft 20 for storage, replacement, repair, or substitution depending on the scenario.

A sign body 40 can include at least one foldable sign member 42, an attachment member 44 and a mounting receiver 46. The sign body can be attached to the mounting member 22 by placing the mounting receiver 46 over the mounting member 22. The attachment member 44 can be used for mounting additional signage (not shown) or for connecting a driving brace 60 for rotation as described below. The foldable sign members 42 may be attached at one end to the sign body 40 by a hinge member 48. The foldable sign members 46 can include further attachment means (not shown) for connecting to another foldable sign member 46 to increase the area of the sign body 40. Such attachment means can include magnets, hook and loop material, screws, pins or any other attachment means known in the art. The foldable sign members 46 can further include a reflective surface 50 for increasing the visibility of the sign body 40. The sign body 40 can comprise printed indicia to further convey a message.

The sign body 40 is generally modular in nature. As used herein the term "modular" means that the sign body 40 disclosed herein can include one or more separate pieces (not shown) that may be added to the sign body 40 to enhance its functionality. By way of example, the sign body 40 disclosed herein can include clips (not shown) for safety or barrier tape (e.g., crime scene tape) (not shown), attachment members for lights (not shown), mounts for audible signals (not shown), and any other attachment that may further the purpose of the sign body 40.

Each leg 26 can include a cleat 28 at the second end of the leg 26 to provide an additional grip into a substrate such as sand, dirt, grass, or any substrate having similar characteristics. Each leg 26 can further comprise a foot (not shown) comprising a material with a high friction, such as, for example, rubber or silicon to maintain its position on a substrate. In addition, each leg 26 can be weighted (not shown) in the body of the leg 26 or at the second end of the leg 26 to facilitate maintaining the position of the base 10. Each leg 28 can further include a reflective surface 50 to enhance the visibility of the base 10. Each leg 26 can further include attachment points (not shown) for receiving modular attachments (not shown) such as, for example, lights, additional anchors or any other modular item that can further the purpose of the base 10 or attached sign body 40.

Figure 12:
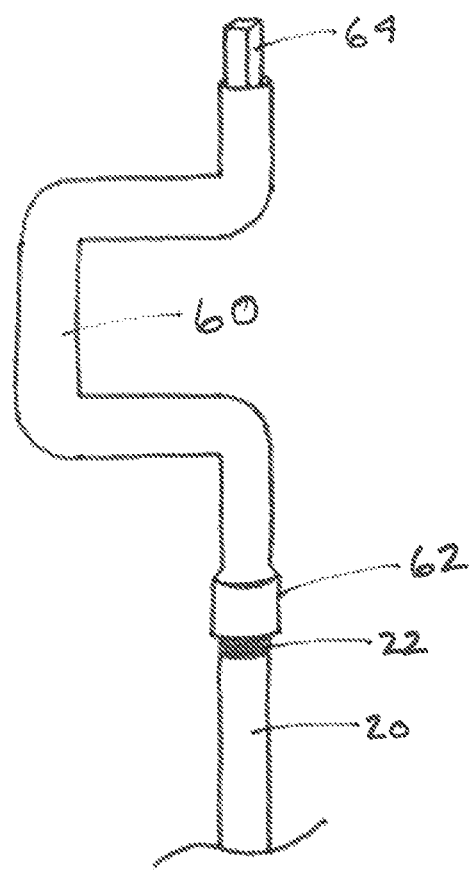
FIG. 12 is an illustration of a driving brace attached to the concentric shaft of the base in accordance with aspects of the present invention.

As shown in FIG. 12 driving brace 60 may be used to rotate the shaft 20. The driving brace 60 can comprise a driving receiver 62 at a first end of the driving brace and a driver attachment point 64 at a second end of the driving brace 60. The driving receiver 62 can be attached to the mounting member 22 of the shaft 20 wherein the driving brace is then utilized to rotate the shaft 20 and thus the anchor 24. Because the driving brace 60 further comprises a driver attachment point 64, the brace 60 may be left on the shaft 20. The mounting receiver 46 of the sign body 40 may attached to the driver attachment point 64 and increase the elevation of the sign body 40 on the base 10.

Example

By way of example, the method disclosed herein comprises, beginning from the folded position of the base 10, ensuring that the locking member 32 is not locked, moving the adjustable attachment 30 downward on the shaft 20 thereby unfolding the unfolding the legs 26 on the base 10 and placing it in a desired location. If anchoring is necessary, a driving brace 60 may be attached to the mounting member 22 by attaching the driving receiver 62 of the driving brace 60 to the mounting member 22. The driving brace 60 is rotated to drive or screw the anchor 24 into the substrate. Once the anchor 24 is anchored in the substrate and the base 10 is in the desired position, the locking member 32 can be engaged to enhance the rigidity of the base 10. The driving brace 60 can then be detached from the mounting member 22 and a sign body 40 attached in its place, or the sign body 40 may be attached directly to the driver attachment point 64 of the driving brace 60.

The sign body 40 may comprise a warning message or other indicia to alert persons to a specific condition or hazard. Portions of the sign body 40 may be foldable for storage and unfolded when in use to increase the size and visibility of the sign. As used herein, the term "warning message" is not intended to be limited to providing information about a hazardous or dangerous situation, but is intended to be liberally construed to include any conveyance of information in the way of signage.

The base 10 can have enhanced features such as, for example, a telescoping shaft 20 or sign body 40. The sign body 40 can include additional features, such as, for example, magnetic attachments and attachment points, reflective surfaces, lighting, digital signage, clips or any other feature that may enhance the purpose of the sign body 40.

Having now described the invention, the construction, the operation and use of preferred embodiments thereof, and the advantageous new and useful results obtained thereby, the new and useful constructions, and reasonable mechanical equivalents thereof obvious to those skilled in the art, are set forth in the appended claims.

What is claimed is:

1. A base for supporting an object comprising: a shaft having a mounting member at a first end of said shaft and an anchor at a second opposite end of said shaft, a plurality of legs wherein each of said legs is hingedly attached to an adjustable attachment member at a first end and support the base on a substrate at a second opposite end, wherein each of said legs further comprises a cleat at said second end and wherein each of said legs is further hingedly attached to a support member at about the middle of each of said legs at a first end of said support member, wherein said support member is hingedly attached to a static attachment member at a second opposite end of said support member, wherein said adjustable attachment member and said static attachment member each further comprise an aperture for concentrically and rotatably receiving the shaft, wherein the adjustable attachment member may be selectively moved along the shaft and wherein proximity of the adjustable attachment member and static attachment member along the shaft is inversely proportional to the proximity of the second ends of the legs to each other thereby providing stability on the substrate and wherein said shaft is rotatable relative to the legs and said anchor may be selectively inserted into the substrate to enhance the stability of the base.

2. The base of claim 1 wherein said legs are collapsible.

3. The base of claim 1 wherein said legs can be locked into place by a locking member on said adjustable attachment.

4. The base of claim 1 wherein a means to rotate the shaft can connect to the mounting member to facilitate the insertion of the anchor into the substrate.

5. The base of claim 1 wherein said anchor is removable from the shaft.

6. The base of claim 1 wherein the anchor is selected from the group consisting of: an auger, screw, bolt, helix, and spike.

7. The base of claim 1 wherein a sign body is attached to the mounting member.

8. The base of claim 7 wherein said sign body is foldable.

9. The base of claim 1 wherein said sign body comprises printed indicia.

10. The base of claim 1 wherein said sign body comprises reflective material.

11. A base for supporting an object comprising: a shaft having a mounting member at a first end of said shaft and an anchor at a second opposite end of said shaft, a plurality of legs wherein each of said legs is hingedly attached to an adjustable attachment member at a first end and support the base on a substrate at a second opposite end, wherein each of said legs further comprises a cleat at said second end and wherein each of said legs is further hingedly attached to a support member at about the middle of each of said legs at a first end of said support member, wherein said support member is hingedly attached to a static attachment member at a second opposite end of said support member, wherein said adjustable attachment member and said static attachment member each further comprise an aperture for concentrically and rotatably receiving the shaft, wherein the adjustable attachment member may be selectively moved along the shaft and wherein proximity of the adjustable attachment member and static attachment member along the shaft is inversely proportional to the proximity of the second ends of the legs to each other thereby providing stability on the substrate, wherein said shaft is rotatable relative to the legs and said anchor may be selectively inserted into the substrate to enhance the stability of the base and wherein the adjustable attachment member further comprises a locking member for maintaining the position of the legs.

12. The base of claim 11 wherein a means to rotate the shaft can connect to the mounting member to facilitate the insertion of the anchor into the substrate.

13. The base of claim 11 wherein said anchor is removable from the shaft.

14. The base of claim 11 wherein the anchor is selected from the group consisting of: an auger, screw, bolt, helix, and spike.

15. The base of claim 11 wherein a sign body is attached to the mounting member.

16. The base of claim 15 wherein said sign body is foldable.

17. The base of claim 15 wherein said sign body comprises printed indicia.

18. The base of claim 15 wherein said sign body comprises reflective material.

19. A base for supporting signage comprising: a shaft having a mounting member at a first end of said shaft and an anchor at a second opposite end of said shaft, a plurality of legs wherein each of said legs is hingedly attached to an adjustable attachment member at a first end and support the base on a substrate at a second opposite end, wherein each of said legs further comprises a cleat at said second end and wherein each of said legs is further hingedly attached to a support member at about the middle of each of said legs at a first end of said support member, wherein said support member is hingedly attached to a static attachment member at a second opposite end of said support member, wherein said adjustable attachment member and said static attachment member each further comprise an aperture for concentrically and rotatably receiving the shaft, wherein the adjustable attachment member may be selectively moved along the shaft and wherein proximity of the adjustable attachment member and static attachment member along the shaft is inversely proportional to the proximity of the second ends of the legs to each other thereby providing stability on the substrate, wherein said shaft is rotatable relative to the legs and said anchor may be selectively inserted into the substrate to enhance the stability of the base, wherein the adjustable attachment member further comprises a locking member for maintaining the position of the legs, and wherein a sign body is attached to said mounting member.

20. The base of claim 19 wherein said sign body is foldable.

* * * * *